United States Patent
Boys (10) Patent No.: US 6,621,183 B1
(45) Date of Patent: Sep. 16, 2003

(54) SUPPLY OF POWER TO PRIMARY CONDUCTORS

(75) Inventor: John Talbot Boys, Auckland (NZ)

(73) Assignee: Auckland Uniservices, Ltd. (NZ)

( * ) Notice: Subject to any disclaimer, the term of this patent is extended or adjusted under 35 U.S.C. 154(b) by 0 days.

(21) Appl. No.: 09/555,796

(22) PCT Filed: Dec. 4, 1998

(86) PCT No.: PCT/NZ98/00179

§ 371 (c)(1),
(2), (4) Date: Aug. 14, 2000

(87) PCT Pub. No.: WO99/30402

PCT Pub. Date: Jun. 17, 1999

(30) Foreign Application Priority Data

Dec. 5, 1997 (NZ) ................................. 329340
Mar. 18, 1998 (NZ) ................................. 329991

(51) Int. Cl.$^7$ ............................................. H01R 34/00
(52) U.S. Cl. ................................................. 307/145
(58) Field of Search ........................ 307/104, 147; 191/10

(56) References Cited

U.S. PATENT DOCUMENTS

| 4,449,685 A | | 5/1984 | Salmon et al. | |
| 5,293,308 A | * | 3/1994 | Boys et al. | 324/392 |
| 5,619,078 A | * | 4/1997 | Boys et al. | 104/287 |
| 5,821,638 A | * | 10/1998 | Boys et al. | 307/104 |
| 5,831,841 A | | 11/1998 | Nishino | |
| 5,898,579 A | * | 4/1999 | Boys et al. | 191/10 |
| 6,005,304 A | * | 12/1999 | Seelig | 307/104 |

FOREIGN PATENT DOCUMENTS

WO  9217929  10/1992

OTHER PUBLICATIONS

"Class–E Amplifier with an Inductive Impedance Inverter" Marian K. Kazimierczuk and Xung T. Bui; IEEE Transactions on Industrial Electronics; vol. 37, No. 2, Apr. 1990, pp. 160–166.

* cited by examiner

Primary Examiner—Ronald W. Leja
(74) Attorney, Agent, or Firm—Saliwanchik, Lloyd & Saliwanchik (57) ABSTRACT

Apparatus for providing effective amounts of high-frequency AC power to a long primary trackway (1102), used for inductive power transfer includes transconductance-pi filters (1105) for deliberate mismatching; resulting in independence of current flow and track impedance. These cause the source (1101) to appear as a voltage source and the trackway to appear as a low reactance. Shorting the output (1106) cuts the connected trackway from power without harm. The filter can cause a voltage step-up so driving a longer track. Track termination apparatus is disclosed that acts as a short circuit at only the operating frequency while terminating the track at its characteristic impedance otherwise. Half-bridge and full-bridge power supplies (1101) are described for providing effective amounts of high-frequency AC power to a long primary trackway used for inductive power transfer.

14 Claims, 5 Drawing Sheets

PRIOR ART

SUPPLY OF POWER TO PRIMARY CONDUCTORS

TECHNICAL FIELD OF THE INVENTION

This invention relates to the supply of power to the trackway conductors forming the primary circuit of an inductive power supply system; in particular this invention relates to the supply of power to the trackway conductors connected in a series resonant circuit which comprises the primary circuit of an inductive power supply system capable of distributing inductive power over a distance.

BACKGROUND

An inductive power transfer system generally comprises (a) a generator of alternating current, (b) one or more conductors carrying the alternating current as tracks (the "primary inductive pathway") to one or more consumers, (c) a space carrying an alternating magnetic flux as a consequence of current flow within the conductor(s), (d) a pickup means (the "secondary winding"), which intercepts a part of the magnetic flux, and (e) power consuming means. Systems originating from our developments have been characterised by inclusion of: (f) an operating frequency generally above 10 kHz, (g) a tuned, resonant primary and a tuned, resonant secondary, (h) loose coupling between primary and secondary, and (i) provide power control by means of partial decoupling of the secondary without significantly affecting other consumers sharing the same primary conductors.

We first developed parallel tuned primary inductive pathways for inductive power transfer. When inductive power transfer is to be applied to systems including relatively long primary inductive pathways or tracks, high-frequency alternating currents at the high voltage that is required to drive parallel-tuned tracks become rather difficult to generate in a practicable manner. The high voltage is required in order to insert sufficient current into the track, given an unavoidable track inductance. It is difficult to drive a long, parallel-tuned track because (apart from safety and insulation considerations) there are finite limits to the voltage that can be switched, and handled, using known technology. Furthermore, safety is a real issue. Track extension methods are not suitable for parallel tuned tracks because when the track length is increased the "group velocity" of the track tends to zero while the characteristic impedance at the required frequency tends to infinity. In contrast, series compensated tracks can be extended using "modules" including lumped series capacitors, without adding to the number of system poles.

Previous techniques for generating AC resonant currents in inductive power transfer have generally been optimised for the case of parallel-tuned circuits. An example high-frequency converter (see FIG. 1) has a half-bridge configuration. The action of the switches can be regarded simply as adding boosts to the resonating current, like maintaining a child's movements on a swing. Usefully, the switches generally change state at or very close to a zero-voltage condition and switching losses are thereby minimised. In our preferred version, the resonating capacitance is generally a lumped capacitance within or close to the power supply, and the track inductance comprises most of the resonating inductance. The current in the track is a relatively pure sine wave. This type of converter is described for example in our Application No: PCT/GB92/01463. It can be regarded as a "half-bridge" converter, where a centre-tapped inductor having a high reactance forms a passive half of a bridge and provides a DC return path. This type of converter is generally used in a "slave" mode in that its switching frequency is determined by the actual resonant frequency of the system. The particular converter that we have selected is quite efficient, has low switching losses, and the switches themselves do not carry the magnetising current of the track. However it does have a propensity to detuning and having an unstable frequency under heavy loads, and the energy stored in the DC inductor may cause a voltage and/or current overshoot if the load is reduced suddenly.

Now that the advantages of series compensated tracks (as defined later) are becoming evident, and series compensated tracks are seen as being more relevant to commercialisation of inductive power transfer, other types of power supply may be preferable.

Furthermore, for possible applications such as the provision of inductive power to rail vehicles, there is a need to raise the amount of current that can be fed into a given track, and to raise the distance over which that current can be effective, and in general there is a need for reduction of the capital costs associated with an installation.

DEFINITION

A series compensated track for use in inductive power transfer systems may be described as an elongated conductive loop wherein the outgoing and return conductors are parallel and spaced apart. During installation the inductive reactance is maintained at or near a relatively small value despite extensions of length, by inserting sets of discrete capacitors in series with the conductors at one or more evenly spaced sites. One example "small value" of inductance is 620 $\mu$H—in relation to a track energised at 15 kHz, resistance 0.4 ohms, circulating current 250 A, at 1 kV rms.

OBJECT

It is an object of this invention to provide improved means for energising an inductive power transfer system, or at least to provide the public with a useful choice.

STATEMENT OF INVENTION

In a first broad aspect the invention provides apparatus for the supply of power from an alternating power source to the primary conductors of an inductive power transfer system having at least one tuned primary trackway; each primary trackway having an inherent resonant frequency, wherein the apparatus includes at least one reactive network having an input and an output; the network being capable of being connected between the power source and at least one primary trackway, said network including at least one inductance having a selected value and connected to at least one capacitance having a selected value, said network being capable of affecting a transfer of power between the supply of power and the at least one primary trackway.

Preferably the tuned primary trackway includes one or more series compensating capacitors along its length In a related aspect the invention provides apparatus as previously described, wherein the network comprises a transconductance pi network (as herein defined) including one or more inductors and one or more capacitors, the transconductance pi network having an input and an output; the network being capable of being connected at the input to the power source and at the output to at least one primary trackway, wherein the network is capable of providing a deliberately mismatched coupling between the source of alternating power and the primary trackway so that the source appears to present a substantially infinite impedance and the primary trackway appears to present a substantially zero impedance; and so that the voltage at the output of the transconductance pi network may in use be substantially greater than that provided to the input of the transconductance pi network.

In another related aspect the invention provides apparatus as previously described, wherein the component values within any one transconductance pi network are selected so that the network is capable of determining the proportion of circulating current to be fed from the output of the network into the primary trackway and so that the amount of circulating current within the primary trackway can be controlled.

In a further related aspect the invention provides apparatus as previously described, wherein the apparatus comprises at least one transconductance pi network, each network being connected to a corresponding primary trackway, the network or networks being capable by means of a selection of suitable component values of determining the proportion of circulating current that may be fed from the network into each primary trackway so that the amount of circulating current within the primary trackway can be controlled.

In yet another related aspect the invention provides apparatus as previously described, wherein the apparatus comprises more than one transconductance pi network each connected through controllable switching means to one primary trackway, so that the amount of circulating current within the primary trackway can be controlled by connection of the outputs of one or more networks at any time to the primary trackway.

In a still further a related aspect the invention provides apparatus as previously described, wherein the apparatus comprises at least one transconductance pi network connected to each primary trackway, the at least one network being provided with at least one set of additional reactive components capable as a group of being controllably switched into or out of the network circuit from a first set of components capable of determining a first current, to a second set of components, capable of determining a second current, so that the circulating current to be supplied from the output of the network into each primary trackway can be controlled from time to time and so that the amount of circulating current within the primary trackway can be controlled.

In a yet further related aspect the invention provides apparatus as previously described, wherein the apparatus provides switching means across the primary conductors of a primary trackway at a position where any one transconductance pi network is connected to the trackway; the switching means being capable when in a closed state of shorting the trackway so that the amount of circulating current within the primary trackway falls, and so that the primary trackway is in effect disconnected from the power supply yet the power supply itself does not experience a short-circuited output.

In an even further related aspect the invention provides apparatus as previously described, wherein one or more of the inductive components of any one transconductance pi network are selected so that the one or more inductive components are capable of entering a state of saturation if a current greater than an intended current should flow through the saturable inductor, so that the maximum amount of circulating current within the primary trackway can be limited.

In an even yet further related aspect the invention provides apparatus as previously described, having more than one primary trackway wherein each primary trackway forms a part of an extended primary trackway; an end of each primary trackway meeting an end of at least one other primary trackway near an alternating power source; each primary trackway being fed at the connection point by a separate transconductance pi network having a switching means connected across the output of the transconductance pi network, so that in use any primary trackway may be energised in response to the presence of a consumer of inductive power upon that primary trackway by opening the corresponding switching means, so that the power supply output may be directed down a selected section of the primary trackway and limitations of trackway length based on power supply capacity are substantially overcome.

In one more related aspect the invention provides an inductor suitable for use with apparatus including a transconductance pi network as previously described, wherein the inductor is provided with a ferrimagnetic or ferromagnetic core capable of saturation at an intended level of current, so that the total circulating current within the network may be limited.

In a still yet further related aspect the invention provides an inductor suitable for use with a transconductance pi network as previously described, wherein more than one turn of litz wire is held within a conductive container and apart from the inner surface of the container.

In a subsidiary aspect the invention provides inductor apparatus as previously described, wherein a ferrimagnetic core comprising one or more ferrite elements each having a "C" shaped or modified toroidal ferrite core including an air gap is threaded over about one turn of litz wire. In another subsidiary aspect the invention provides an inductor as previously described, wherein the one or more ferrite elements are each mounted by means of a support occupying the air gap.

In a second broad aspect the invention provides apparatus as previously described, wherein the apparatus further includes termination apparatus; the termination apparatus being connected between an end of one conductor and an end of the other conductor at a position remote from a connection to a power supply, the termination apparatus comprising in parallel connection (A) a substantially pure resistance capable of exhibiting the characteristic impedance of the track at substantially any frequency, and (B) a series tuned resonant circuit tuned to the inherent resonant frequency; the termination apparatus being capable at the resonant frequency of presenting a short circuit to the track and capable of presenting the characteristic impedance to the track at other frequencies, so that the harmonic content of the current circulating in the track is reduced.

In a third broad aspect the invention provides power supply apparatus for the supply of power to the primary conductors of an inductive power transfer system having at least one series-tuned primary trackway; each primary trackway having an inherent resonant frequency, wherein the power supply apparatus comprises a set of four switching means arranged in a first, and in a second series-connected pairs across a supply of electric power, the series compensated trackway being connected from the junction between the first series-connected pair of switching means to the junction between the second series-connected pair of switching means, the apparatus having control means capable of delivering switching commands capable of causing each switching means to repeatedly open or close in a cyclic relationship controlled with respect to the other switches, so that both switches of either pair are not closed at the same time and so that the series compensated trackway is repetitively connected across the supply of electric power first in one direction and then the other, at or near the inherent resonant frequency of the track.

In a related aspect the invention provides power supply apparatus as previously described, wherein the apparatus is driven from a voltage source of power.

In another related aspect the invention provides power supply apparatus as previously described, wherein the apparatus is driven from a current source of power.

In a further related aspect the invention provides power supply apparatus as previously described, wherein the apparatus is driven from a current source of power and further includes a parallel resonant circuit, capable of resonance at or near the inherent resonant frequency of the track, connected across the output of the power supply apparatus.

In yet another related aspect the invention provides power supply apparatus as previously described, wherein the apparatus includes control means capable of determining the controlled relationship; said control means being further capable of permitting variation of a pulse duration of the switching commands to at least one pair of switching means, so that the amount of current circulating in the series compensated track can be varied.

In a yet further aspect the invention provides power supply apparatus as previously described, wherein at least one of the switching means is adapted by means of installation of a capacitor across each switching means so as to be capable of being switched by a control means when in a zero-voltage state and by means of alteration of the inherent resonant frequency of the series compensated track to be slightly lower than the rate of delivery of control signals to the switching means.

In a still yet further aspect the invention provides power supply apparatus as previously described, wherein the power supply apparatus includes a parallel resonant circuit having a resonant frequency, and includes at least two switching means arranged to be capable of connecting a current from a current source to the resonant circuit and operated so that repetitive complementary closures of the switching means at a frequency close to the resonant frequency is capable of causing resonant current to flow within the parallel resonant circuit, and a power output from the power supply apparatus is connected across the parallel resonant circuit, wherein the power supply apparatus employs four switching means in a full bridge configuration to connect current from the current source to the resonant circuit.

In a fourth broad aspect the invention provides apparatus for supplying inductively transferable power over a distance; the apparatus comprising (1) a conductive primary pathway or track having a pair of conductors capable of carrying the current; the track including one or more sets of series capacitors capable of compensating for the series inductance and hence comprising a series of circuits capable of resonating at a resonant frequency, the track being terminated with (a) a short-circuit at the resonant frequency and (b) at the characteristic impedance of the track for other frequencies, and (2) a power supply capable of generating alternating current at a desired frequency and including an adaptation for feeding its output into the track.

In a related aspect the invention provides a first type of power supply apparatus for energising a conductive primary pathway or track of an inductive power transfer system with alternating current, wherein the power supply apparatus includes a set of four switches arranged in a bridge configuration and having a supply of electric power, and having means for causing each switch to open or close in a controlled relationship with respect to the other switches, so that the series compensated track, connected across the other arms of the bridge, is repetitively connected to the supply of electric power first in one direction and then the other, at or near the inherent resonant frequency of the track.

Preferably the controlled relationship permits variation of the phase of the drive to at least one pair of switches, so that the amount of current circulating in the series compensated track can be varied. Preferably any or each of the switches can be switched when in a zero-voltage state by a procedure comprising (a) installing a capacitor across each switch, and (b) supplying the switching commands at a frequency slightly higher than the natural resonant frequency of the system, including the series compensated track.

In a further related aspect the invention provides a second type of power supply apparatus for energising a conductive primary pathway or track as previously described of an inductive power transfer system with alternating current, wherein the power supply apparatus includes a parallel resonant circuit having a resonant frequency, a current source, and at least two switches arranged to connect the current to the resonant circuit and operated so that repetitive complementary closures of the switches at a frequency close to the resonant frequency is capable of causing resonant current to flow within the parallel resonant circuit, and a power output from the power supply apparatus is connected across the parallel resonant circuit.

In a still further related aspect the power supply apparatus employs four switches in a full bridge configuration to connect current from the current source to the resonant circuit.

In yet another related aspect the invention provides a method for removing the current from a primary inductive pathway fed from a trans-pi network, wherein the method comprises shorting the primary inductive pathway at or near the point of feed.

In a yet further related aspect the invention provides a method for varying the current circulating within a primary inductive pathway fed from more than one network, wherein the method comprises controllable addition of the outputs from each of the more than one network into the primary inductive pathway.

DESCRIPTION OF FIGURES

The preferred embodiments to be described and illustrated in this specification are provided purely by way of example and are in no way intended to be limiting as to the spirit or the scope of the invention.

PREFERRED EMBODIMENT

Parallel-tuned trackways (as shown in the prior art FIG. 1) are not practicable for long-distance distribution of inductively transferred power, in part because the voltage requirements for inserting current into a track will quickly reach the limits of safety and of component ratings. (103 represents the inductance of the straight primary conductors and 101 represents the capacitance between them, while 102 is a lumped capacitor which serves to tune the trackway to the system frequency).

This application particularly relates to a series-compensated primary trackway, in which the conductors include lumped series capacitances as appropriate for maintaining the system-wide resonant frequency at or near a desired value. Advantages of the series-compensated design include:

1) A substantially constant impedance is seen by the power supply, regardless of length, so that voltage requirements remain feasible.
2) Because there are no additional system poles, the resonant frequency is stable. For example, there are no ties linking various nodes of the track, and because the whole track is one resonant circuit, different modes of resonance do not occur.
3) Of course resistive (skin-effect) losses and radiation, for example, will eventually limit the feasible length of series-compensated primary trackways.

Figure 2:
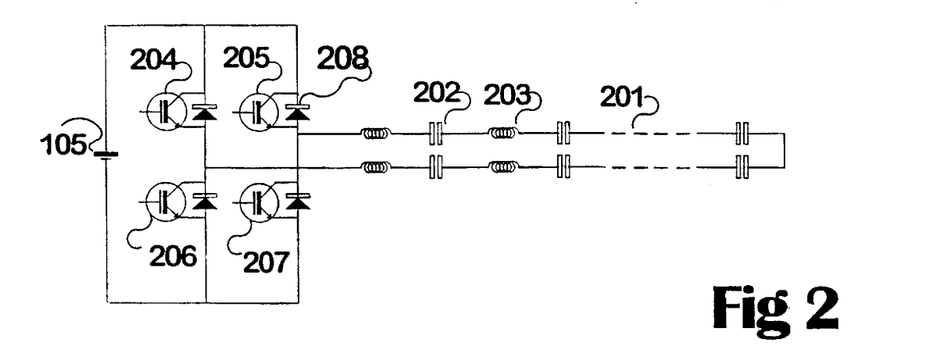
FIG. 2: shows a simplified circuit diagram of a full-bridge converter, according to our invention, for providing current to a series-compensated track.

EXAMPLE 1 (FIG. 2)

This example comprises a full-bridge switching circuit in which each arm of the bridge is occupied by a switch and no resonating components exist within the circuit. A circuit illustrating the principle is illustrated in FIG. 2. Our preferred switches are insulated-gate base transistors (IGBTs) and our preferred operating frequency is generally at about 10 kHz, although IGBT devices are becoming increasingly capable of high-speed operation. The series resonant track is indicated at 201 and comprises a series of series capacitors 202, in series with track inductance 203 (here the track inductance is shown as a lumped symbol).

In the simple form at least, each of the four switches (204, 205, 206, 207) is operated in a 180 degree conduction angle, and current passes alternately from a DC supply 105 through 204, then through the track, then 207, or from the DC supply though 205, through the track in the opposite direction, and then 206, to reach the DC return path. Diodes (e.g. 205) absorb switching transients. There are likely to be significant switching losses in this circuit, in which the switches are usually not opened or closed at zero-voltage instants.

Figure 4:
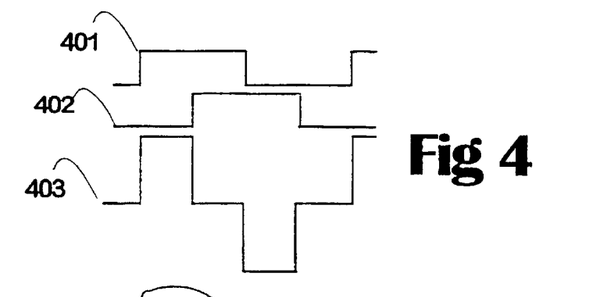
FIG. 4: shows a simplified circuit diagram of waveforms associated with a full-bridge converter.

FIG. 4 indicates the waveforms to be expected in this type of circuit. 401 is the gate drive to one set of switches (e.g. 204 and 207) and 402 is the drive to the diagonally opposite set (e.g. 205 and 206). Waveform 403 shows the resulting current supplied to the series resonant track or primary conductor 201 (with (lumped) inductance 203 and interspersed series capacitances 202). Because the odd harmonics in the initially square waveform see a greater inductance than does the fundamental component, the current waveform within the track tends to become comparatively sinusoidal.

Control of Track Current

In order to control track current, one can either vary the voltage of the DC source, or vary the phase of the drive signals to the switches, relative to one reference drive signal, so that as the phase $\alpha$ is varied between 0 and 180 degrees, the output voltage (of the fundamental) ranges between zero and about 90% of the DC supply. The relationship (for the nth harmonic) is given by:

$$Vn = \frac{4E_{DC}}{\pi n \sqrt{2}} \sin\left(\frac{n\alpha}{2}\right) \qquad (1)$$

where Vn is the output voltage, $\alpha$ is the phase angle between a reference drive signal and a second drive signal, and $E_{DC}$ is the DC supply voltage.

It follows that if $\alpha$ is made 120 degrees, then V3 (the third harmonic) is zero, and the first remaining harmonic is the fifth. The small drop in voltage supplied is tolerable for the sake of nulling out the third harmonic.

Figure 3:
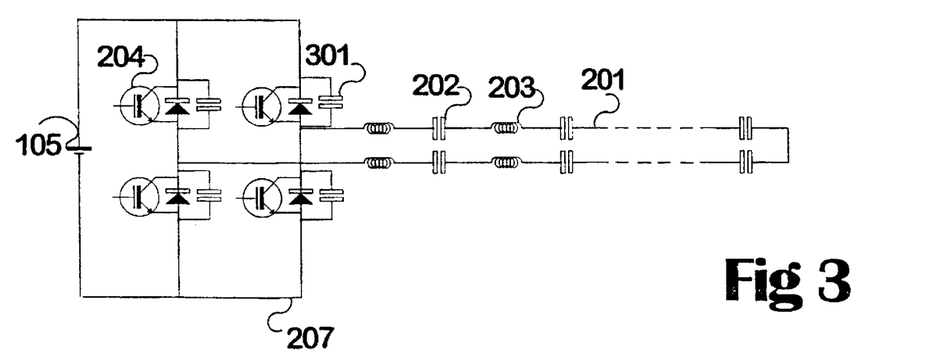
FIG. 3: shows a simplified circuit diagram of a full-bridge converter, according to our invention, including capacitors wired between the emitter and the collector of each IGBT for assisting in obtaining a zero-voltage switching mode.

EXAMPLE 2 (FIG. 3)

Zero-Voltage Switching (Soft switching)

Figure 1:
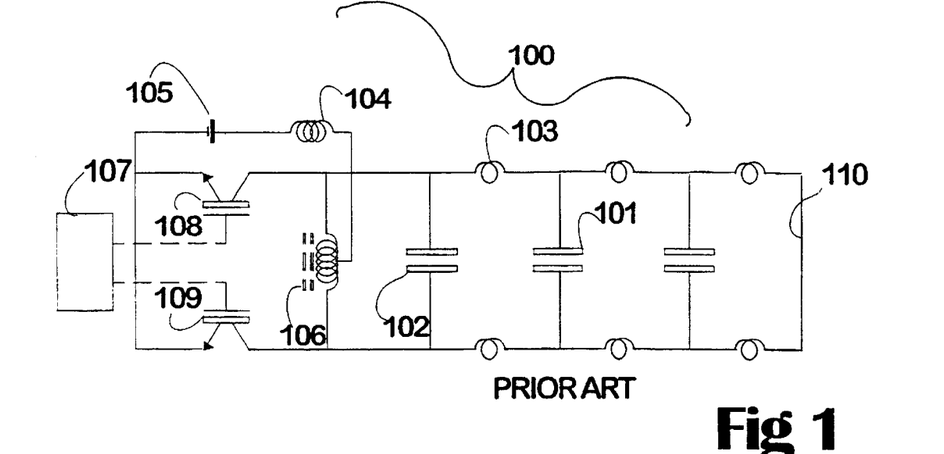
FIG. 1: shows a simplified circuit diagram of a prior-art half-bridge converter, according to our earlier invention, and a prior-art parallel-tuned track.

The prior-art half-bridge resonant converter of FIG. 1 could easily be controlled so as to switch at each zero-voltage instant—a feature which minimises switching losses and the generation of interference. The circuit of FIG. 2 assumed that zero-voltage switching was not intended. We have found that if the circuit of FIG. 2 is driven at a frequency slightly above the resonant frequency of the track and if we also include a small capacitor 301 across each switching device, as shown in FIG. 3, it is then possible to take advantage of the inductive impedance of the track in order to attain zero-voltage switching. A residual track inductance discharges the parallel capacitors during switching transitions. The small capacitors are each of the order of 100 to 1000 nF (example capacitor used at 15 kHz—where switches are 300 A, 1200 V IGBTs are WIMA 0.22 μF FKP1). Of course the "lock-out" time between switching the top and bottom transistors has to be controlled and the knowledge that the turn-off time of a practical solid-state switch is longer than the turn-on time should be included in a design.

Figure 5:
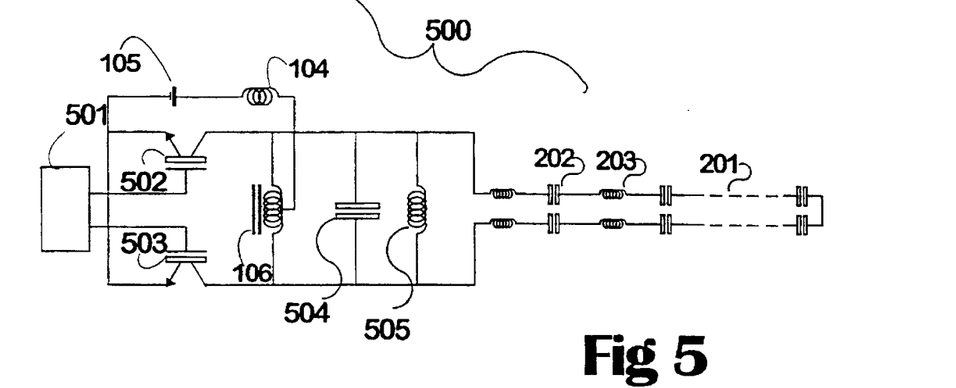
FIG. 5: shows a simplified circuit diagram of a half-bridge converter including a resonant circuit for providing current to a series-compensated track.

EXAMPLE 3 (FIG. 5)

While the full-bridge converters described above have some control advantages, they also suffer from the significant drawback that the full circulating current passes through the switching devices. If a half-bridge power supply could be modified so that it can provide current to a series-compensated track, one would expect that the switching devices would be much more lightly loaded. Furthermore the drive current provided by the previous example is relatively rich in harmonics. Even though the higher harmonics see a higher impedance, at least part of those higher harmonics are radiated.

In FIG. 5, the circuit 500 drives a series resonant primary inductive loop 20; including lumped capacitors 202 and distributed (track) inductances 203 from a half-bridge pair of switches 502, 503 using an internal resonant circuit comprising an inductor 505 and capacitor 504 as a resonant circuit across which the loop is connected. The values of the components may be entirely determined so that resonance at the intended frequency is achieved without reference to the loading track, or the values may allow for the inductance and capacitance presented by the track. The remainder of the circuit 500 is similar to that of FIG. 1; a controller 501 drives the gates of a pair of IGBT devices in a complementary way. These devices pull first one side, then the other, of a DC splitter inductor 106 having a high reactance at the operating frequency towards a negative potential. The centre tap of inductor 106 is fed with a constant current (as a result of inductor 104) from a voltage source 105. This circuit comprises a current sourced half-bridge supply.

Advantages of this circuit include that the current carried by the switches is only that required to "top up" the circulating resonant current, and that the primary trackway 201 is supplied with a close approximation to a sine wave. Because the devices are switched at zero-voltage instants, transients are minimised and the devices can be used at their full ratings, subject of course to the usual frequency of operation derating.

In a full bridge circuit lacking a resonant tank circuit (for example; FIG. 2 or 3), the switching devices must carry the full circulating current, and must be derated for the high-frequency usage (because they are not switched at zero-voltage instants). Although IGBT devices are now being produced that can switch heavy currents at say 15 kHz, they are relatively expensive. If the primary track has a Q of 3.0, and if the frequency derating factor is taken as 2, then switches rated as being capable of switching 6 times the drawn-off current are needed for circuits corresponding to Examples 1 and 2. In contrast, in a half-bridge circuit the switching devices are supplying the "topping-up" current and are switched at zero-voltage instants and so the current rating can be perhaps ¼ to ⅙ the current rating of those in a full bridge. Control of circulating current in the primary pathway, if required, can be exercised through variations in the DC power fed to the half-bridge circuit.

In either case the frequency of the switching currents can be held constant by an autonomous frequency source or can "float" at a switching rate dependent on the overall system resonant frequency (unless, as with FIG. 2 or FIG. 3, one is trying to accomplish zero-voltage switching by using a slightly higher than resonant rate).

Figure 6:
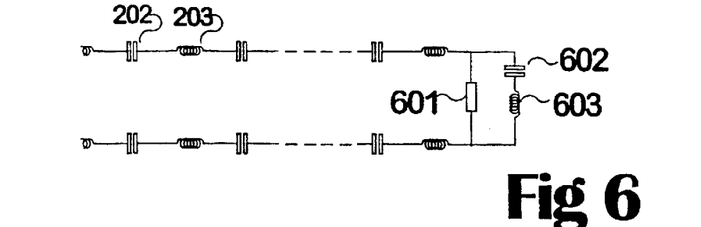
FIG. 6: shows a simplified circuit diagram of a preferred means for termination of a series-compensated track.

EXAMPLE 4 (FIG. 6)

This figure shows the preferred termination apparatus for a series-compensated track. If the track (including a repetitive series of inductance and capacitance 203, 202) was simply terminated by a short circuit (a wire of zero impedance) then the harmonics present in the current produced by the power supply no longer see a short-circuited track but a modified reactive impedance, depending on the electrical length of the track at the harmonic frequency. For example if the electrical length is a quarter wavelength then it will appear to be an open circuit at the input and the harmonic content will be altered. The preferred termination apparatus is intended to act as a proper termination for all harmonics. The impedance 601 is a resistive, frequency-independent impedance, having a value set by reference to the characteristic impedance of the track, and the values of components in the series resonant circuit comprised of inductor 602 and capacitor 603 are chosen to resonate, at the resonant frequency and so present a short circuit. Thus the termination apparatus tends to define the magnitude of currents at frequencies other than resonance.

The least harmonic content is realised when using a power supply including a dedicated parallel resonant circuit such as in FIG. 5 and a termination as per FIG. 6. Under these circumstances the amount of wasted power through radiation (hence minimal radio frequency interference) or through stray coupling is minimised. Loss of power through being unavailable to a tuned resonant pickup device in also minimised, and yet the advantages of a series compensated track are still available.

Figure 7:
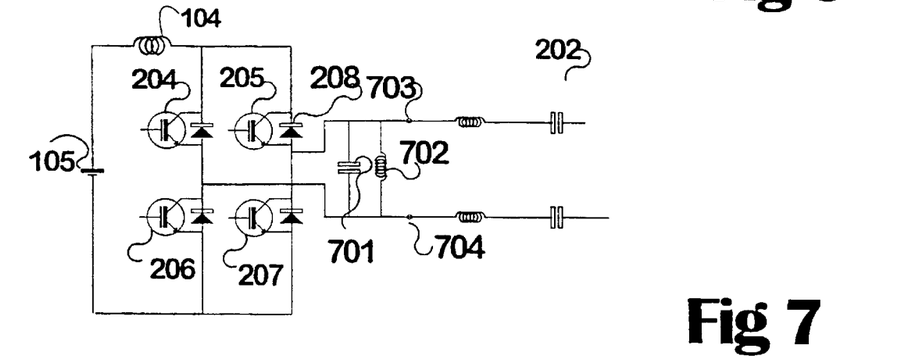
FIG. 7: shows a simplified circuit diagram of a full-bridge converter including a resonant circuit and joined to a series-compensated track.

EXAMPLE 5 (FIG. 7)

This figure shows one preferred configuration for a full bridge power supply including a parallel resonant circuit or tank circuit; a configuration which provides many of the advantages of Example 3. In this circuit, capacitor 701 with inductor 702 are selected so as to be capable of resonance at the intended operating frequency. Of course, a significant amount of circulating current will flow in these components. Switching devices 204, 205, 206, and 207 form a full bridge capable of exciting the resonant circuit by alternately connecting one end or the other of capacitor 701 to high or low voltages. 202 refers to the start of a series compensated primary conductor loop or trackway as illustrated elsewhere. Current to the full bridge is supplied as a constant-current source via inductor 104 from DC source 105. The inductor 104 provides voltage-compliant supply rails and also reduces the return of switching transients into the supply of power—typically a mains supply.

EXAMPLE 6 (FIGS. 8 to 14)

Figure 8:
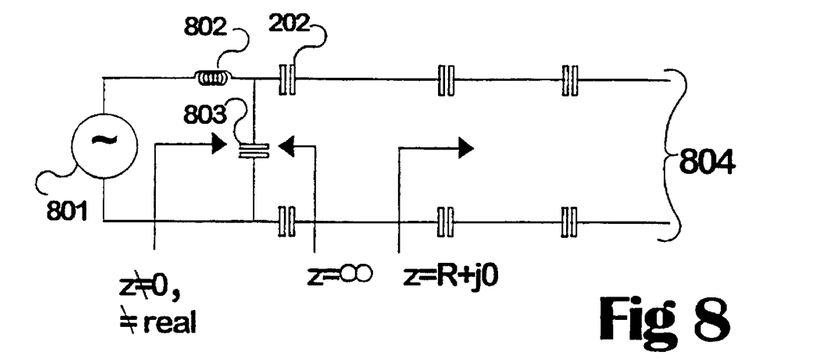
FIG. 8: shows a simplified circuit diagram showing the origination of a transconductance pi ("trans-pi") network for matching a source of power to an inductive power transfer trackway. Note: letters such as "j2", "−j6" in following drawings indicate inductive or capacitative impedances (for example, "j2" = an inductive reactance of 2 ohms and for a 15 kHz system, j2 is equivalent to 21 $\mu$H).

The simplified circuit diagram, FIG. 8, illustrates the general concept of "intentional mismatching". A series-compensated trackway (804) appears as substantially a zero impedance, while the inductance/capacitance network (802 with 803), resonant at the operating frequency, appears to the trackway to be an infinite impedance. Supplying a zero impedance load from an infinite impedance source results in a constant current circulating within the track. Meanwhile a power source 801 driving the system via a resonant circuit comprising inductance 802 and capacitance 803 will see an impedance which is (a) not zero, and (b) not purely resistive.

This concept assumes that any load placed on the trackway is substantially a pure resistance—that is—a resonant circuit which has been tuned reasonably close to that of the primary trackway.

The alternating-current source 801 preferred for use in this example is a voltage source and preferably produces a sine wave voltage or a reasonable approximation to a sine wave, at a constant, predetermined frequency. However these requirements can be varied.

Figure 9:
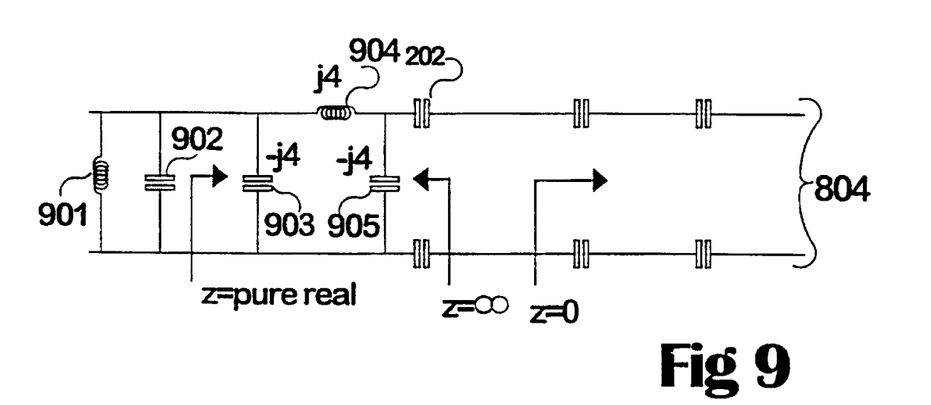
FIG. 9: shows a simplified circuit diagram of a preferred means for matching a source of power to an inductive power transfer trackway, using a trans-pi network.

FIG. 9 develops FIG. 8 into a first version of a transconductance pi ("trans-pi") network for matching a source of current to a series-resonant inductive power transfer trackway 804. 901 and 902 form a tuned circuit that is generally a part of the power source. 903 is a capacitor which was originally determined to serve as a power factor correction capacitor, chosen so that the input resistance to the pi network when driving a purely resistive load is itself purely resistive, so that the frequency of the tuned circuit is constant. Surprisingly, this value is the same as that providing resonance at the operating frequency in conjunction with the inductor 904. For example, if the inductor 904 04) has an inductive reactance of 4 ohms, the capacitor (−j4) should have a capacitative reactance of 4 ohms, as should the capacitor 905. The group of parallel-resonant components, 903, 904, and 905 comprises this version of the transconductance pi ("trans-pi") network. In comparison, the well-known pi coupling network used in radio transmitters to match an aerial load to an output stage is series-resonant.

Figure 10:
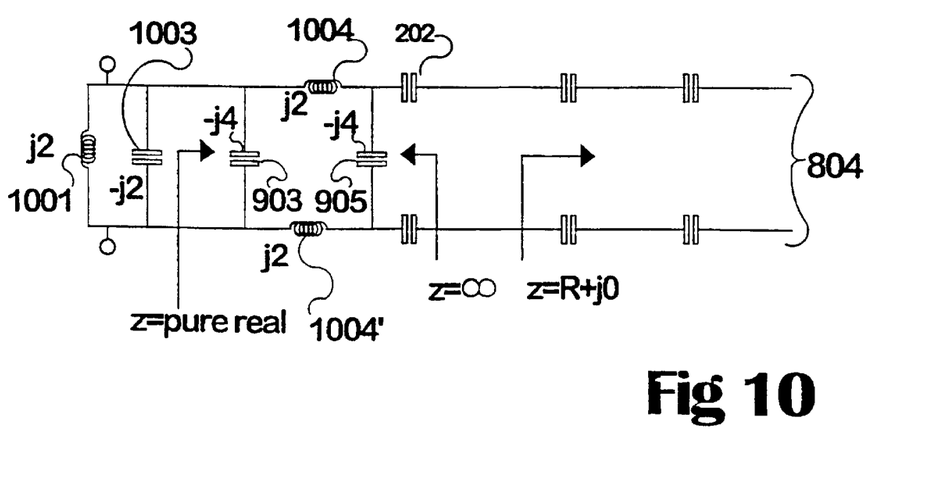
FIG. 10: shows a simplified circuit diagram of a more practical means for matching a source of power to an inductive power transfer trackway, using a trans-pi network.

FIG. 10 shows a simplified circuit diagram of a more preferred means for matching a source of power to an inductive power transfer trackway, using a transconductance pi ("trans-pi") network. Here, the inductance 904 of FIG. 9 is split into a symmetrical pair, one in each leg (1004 with 1004'). One advantage is that currents within the inductive pathway 1005 are balanced and less radio interference is caused. Each inductor is now of reactance j2, not j4 as in FIG. 9. Thus the preferred transconductance pi ("trans-pi") network of this invention comprises (in FIG. 10) capacitors 903 and 905 (each of example capacitative reactance 4 ohms), together with inductances 1004 and 1004' (each of example inductive reactance of 2 ohms).

The current handling capacity should of course be adequate to handle the circulating current which we term the "bias current" as distinct from the "track current". For a 1000 V supply, use of a set of resonant components of reactances j2, −j2 will result in a bias current of 1000/j2=500 A. Typically the track current will be about half of the bias current; regardless of track impedance which typically ranges from 1 to 8 ohms. The inductive reactance of would be about 21 $\mu$H, in a practical system running at 15 kHz, with a supply voltage of 500 V, a bias current of 500 A, and a track current of 250 A. Of course this predetermining process for setting a track current assumes a constant voltage source. If the voltage can change, then currents in various trackways will change in proportion.

One of the advantages of using a trans-pi network with its inherent mismatch is that it can act as a voltage converter. Should the track impedance be greater than the values of reactance used in the network, then the output voltage will be greater than the input, and it is possible to drive a track with several kilovolts output from a trans-pi network while driving that network with a lower, semiconductor-compatible voltage such as 800–1000 volts. This allows a longer length of trackway to be driven.

Figure 11:
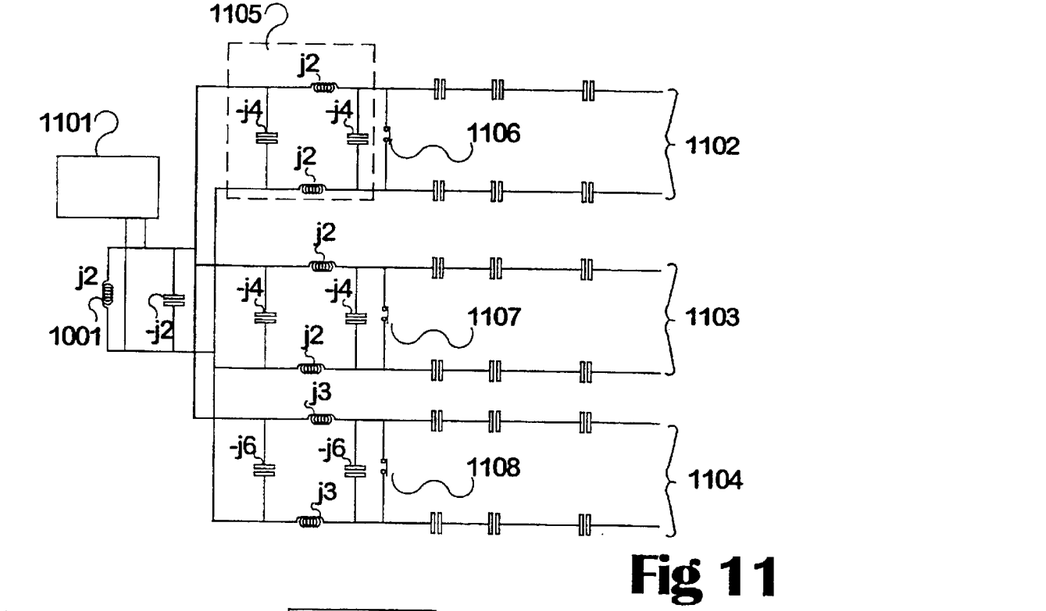
FIG. 11: shows a simplified circuit diagram of an inductive power transfer system layout, using a single power supply and one transconductance pi ("trans-pi") network for each branch.

FIG. 11 shows a simplified circuit diagram including several inductive power transfer trackways, using a single power supply (1101) and a separate trans-pi network (as per the example contained within the box 1105) for each branch. This is a "star" configuration. Because it is possible to switch off the current within a particular branch (any one of 1102, 1103, or 1104) by closing a corresponding shorting switch (1106, 1107, or 1108), a system designer can design a system in which all of the power from one power supply can be fed into any one individual trackway (1102, 1103, or 1104). Alternatively, the power can be shared between several trackways by opening more than one switch at a time. Even if all trackways were shorted, the power supply would not be adversely affected. Furthermore, by predetermining the value of the components of the trans-pi network, as shown for the network supplying the trackway 1104, the current circulating in a particular trackway may be preset. This may be useful if for example certain trackways in a system are used for purposes other than inductive pathways for moving vehicles, but instead have less demanding devices such as battery charging outlets connected to them.

A policy of loss reduction may be implemented in a practical system; by reducing the track current to 0.7, losses are halved. For example, note that trackway 1104 in FIG. 11 has the different reactances of 3 ohms for the inductances and 6 ohms for the capacitances. This results in a circulating current that is 66.7% that of the other two trackways 1102 and 1103, which use reactances of 2 ohms for the inductances and 4 ohms for the capacitances.

This type of circuit can be applied in a "retail interface", where members of the public purchase power from an inductively transferred pathway. Once the consumer's account has been entered and verified (presumably by some electronic means), current can be permitted to flow by action of a "verification controller" on the appropriate switch, and can then be transferred to the consumer. This might be used in road transport or for battery charging.

Figure 12:
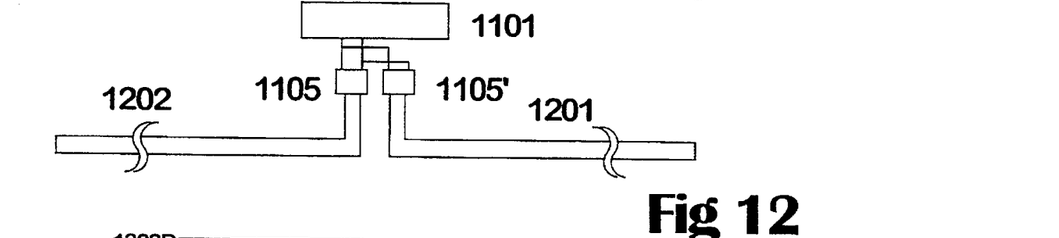
FIG. 12: shows a simplified circuit diagram for providing power to a long inductive trackway, such as a railway or road, by splitting the trackway and providing means to feed either half (as required) through a trans-pi network, both halves being supplied from a single power supply.

FIG. 12: shows a simplified circuit diagram for a method that doubles the length of an inductive power transfer trackway that can be fed by a single power supply. The procedure depends on the possibility of de-energising an individual trackway by shorting it, without affecting the power supply or other trackways also drawing current from the same supply. A single power supply 1101 drives a pair of units 1105, 1105' each like the one contained within the dashed box 1105 of FIG. 11. Each unit also includes a shorting switch, like 1106 in FIG. 11. There is an elongated primary trackway (note: series compensation capacitors not shown) made up of two halves 1201 and 1202, which are brought close together at the region of the power supply/trans-pi networks, at approximately the middle of the elongated trackway. Some form of vehicle proximity detector may be used to determine whether there is a device capable of drawing power located on either half of the trackway and if there is, the corresponding shorting switch 1106 is opened and the trackway is energised, so supplying the consumer. No power is wasted by energising a trackway which cannot feed a power consumer at the time. One form of vehicle proximity detector might comprise weakly energising the trackway and detecting a load; otherwise active sensors, perhaps independent of connection to the trackway conductors could be used. The term "trackway" may also be used to refer to power cabling for use in lighting installations, such as fluorescent lighting installations.

Figure 13:
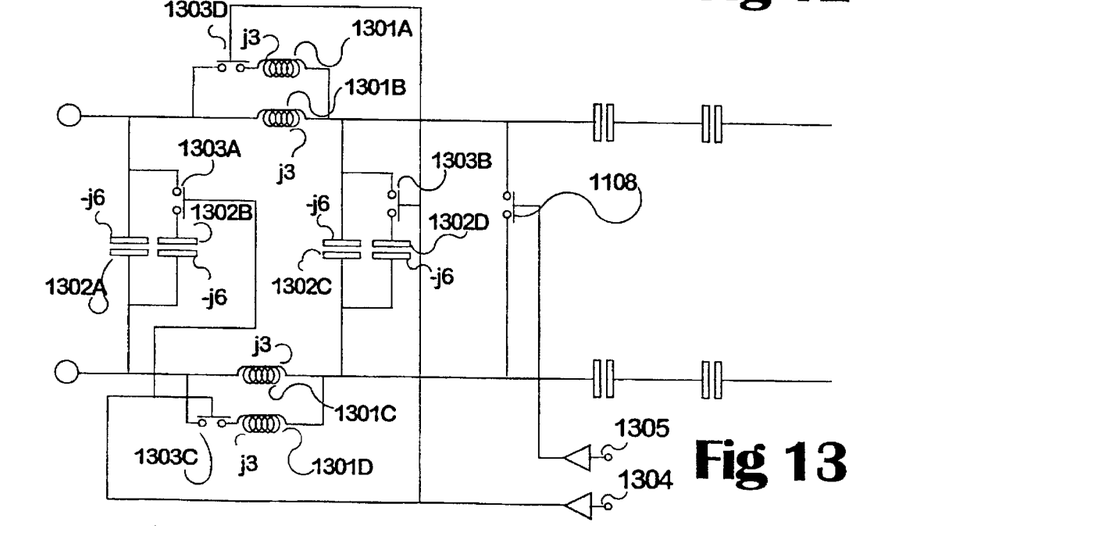
FIG. 13: shows apparatus for providing zero, a low, and a high value of circulating current within a trackway, by means of switches.

In FIG. 13 we show further means for controlling the circulating current within a trackway by switching component values within the trans-pi network. It is possible to employ groups of components instead of single parts, switching in different combinations in order to vary the track current. For example, as shown in FIG. 13, one could decrease inductance from j3 to j6 (by adding parallel inductors 1301A, 1301D across inductors 1301B, 1301C, and at the same time adding parallel capacitance 1302B and 1302D across 1302A and 1302C to go from j-3 to j-6 and, while retaining the condition of resonance, cut the losses to half whenever full power is not required.

In a first operating mode, zero current is obtained by shorting the output of the trans-pi network regardless of whether it is switched to operate in the second or third modes described below. Preferably this switch is one having mercury-wetted contacts so that minimal internal resistance exists, but a solid-state switch alternative may be more reliable and faster in action, for example so that zero-crossing switching can be realised. Control line 1305 controls this switch.

In a second mode, a low track current is obtained by using higher inductance and lower capacitance values within the trans-pi network, while maintaining resonance.

In a third mode, a high track current is obtained by using lower inductance and higher capacitance values within the trans-pi network, again while maintaining resonance. Conveniently, adding inductance and adding capacitance both in parallel across existing components and closing a suitable type of remotely controlled switch affecting control line 1304 to make the connection results in a transition from the second mode to the third mode.

Figure 14:
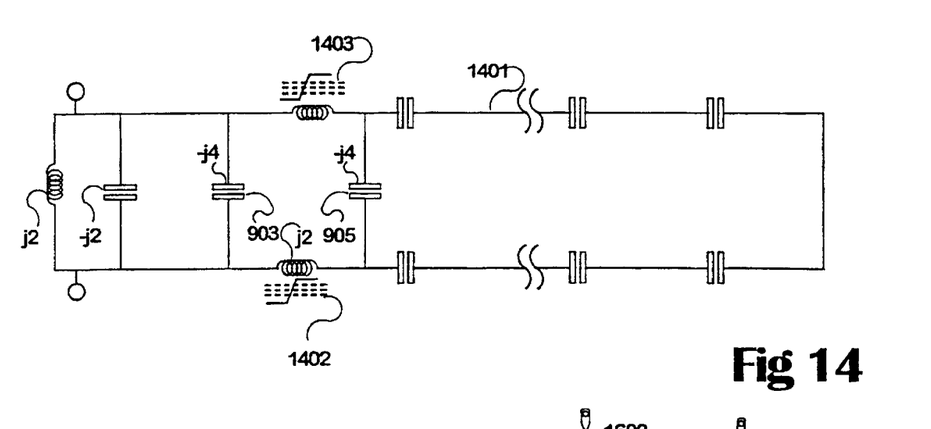
FIG. 14: shows apparatus for limiting the value of circulating current within a trans-pi filter (as may happen if the trackway becomes an open circuit), by means of one or more saturable inductors.

FIG. 14 shows how apparatus and a method may be provided for immediately and passively controlling the current circulating within a trans-pi network should a fault develop, for example if the track 1401 becomes an open circuit. If this happens, the current circulating within the network tends towards infinity. In order to limit the maximum amount of current we prefer to provide saturable inductors having a ferrimagnetic (or ferromagnetic) core. FIG. 14 shows 1402 and 1403 as two saturable inductors. On saturation, the resonant frequency of the network will change away from the pre-saturation value of j2 as indicated and so it will work less effectively with power generated at a defined frequency. Saturation is a bulk property of materials and is fast and be fully reliable. It is desirable to back this protection up with some form of power supply turning-off protection in case continued saturation leads to overheating. Although any ferrimagnetic or ferromagnetic core will eventually saturate, the use of this type of passive protection involves a design step wherein the maximum tolerable amount of current is determined and then the inductor is designed so as to saturate at about that level.

Figure 15:
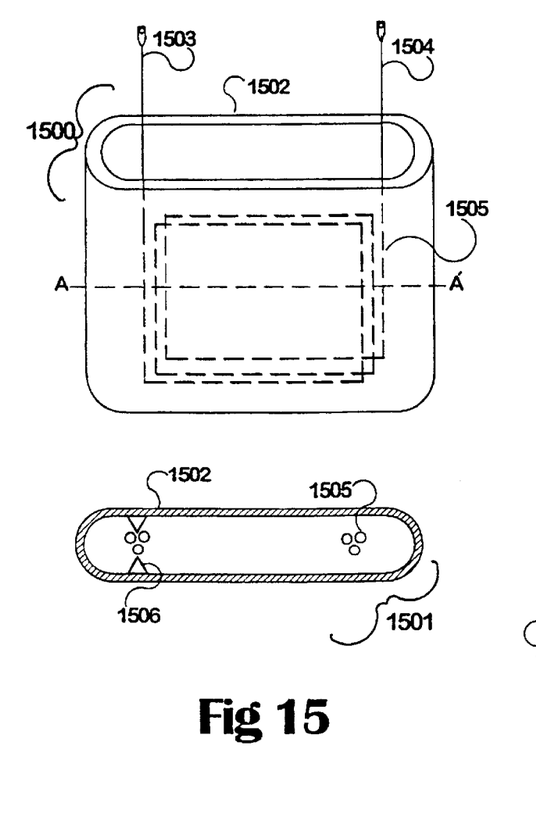
FIG. 15: shows a preferred design for an inductance suitable for use in a trans-pi filter at power levels of around 250 kW.

FIG. 15 shows a physical design 1500 for one type of inductor that could be used with a 250 to 500 kW supply. An inductor of appropriate reactance is comprised of about 10 metres of litz wire 1505 capable of carrying a bias current of about 500 A, formed into a loop of four turns held within an aluminium container 1502 to act as an electrical shield by means of the generation of eddy currents within the inner surface of the box. The section 1501 at A—A, reproduced below, shows how a preferred box would be approximately equidistantly spaced apart from the conductor(s) 1505. The cables comprising the inductance would be clamped (fixing means 1506) so that the windings remain in approximately the centre of the space inside the box 1501. Some cooling apertures would normally be required. Connectors 1503 and 1504 are for electrical connection of the cable to the remainder of the circuit. A box of this type could be hung from the rear of a cabinet holding the remainder of the circuitry.

Figure 16:
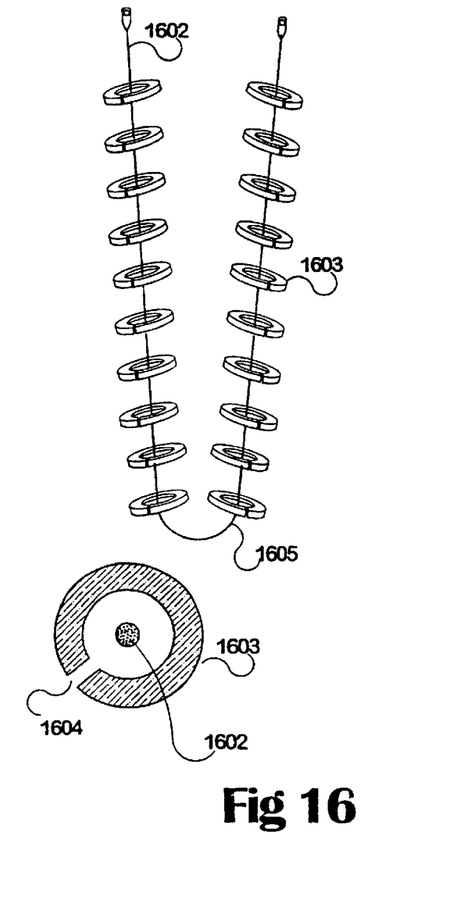
FIG. 16: shows another preferred design for an inductance having a core and suitable for use in a trans-pi filter at power levels of around 250 kW.

FIG. 16 shows another version of the inductor. A single hanging loop 1605 of litz wire passes through a number of ferrimagnetic-cored inductances 1603 each being in this example a "C" shaped interrupted toroid. In practice we might use 50 cores in the descending loop and 50 in the ascending loop. The core raises the inductance of the single turn (perhaps one metre) of wire; provides a saturable component, and also restricts the emergence of magnetic flux from the wire. A shielding box (not shown) is still preferred for containing leaked flux, and for safety and protection. The cores will become heated through hysteresis during use, and convection or forced cooling may be required. A single toroid-like core 1603 is shown in section below, with the conductor 1602 within and a gap 1604 in which the energy is stored. The cost of this design may be less than that for FIG. 15a; if toroids are cheaper than a sufficient amount of litz wire rated to carry 500 A. The cores may be mounted by means of the gap, and the position of the rather flexible cable is thereby controlled. In general the construction of capacitor units for use in a 250 to 500 kW trans-pi unit is a standard procedure.

ADVANTAGES

This invention covers several aspects of the supply of power to the trackway conductors forming the primary circuit of an inductive power supply system. For the power supply examples without a parallel resonant circuit at the output:

1. Zero-voltage switching can be realised, and
2. Control of track current can be provided by altering drive impulses.

For the examples of power supplies including a parallel resonant circuit, advantages include:

1. Capable of driving series-compensated inductive power transfer tracks, and is easily scaled up in power.
2. Zero-voltage switching is accomplished easily.
3. Little or no derating of switches is required at useful frequencies (such as 5, 10, 15 kHz).
4. A sine wave voltage (substantially) is supplied to the track; minimising radiation of harmonics.

For the versions using a "trans-pi" network to supply a series compensated track, advantages include:

1. The use of a trans-pi network for coupling many trackways to a single large power supply is generally much more economical than providing one power supply for each trackway. A design for a complex system of conveyers perhaps including hundreds of individual powered vehicles in a factory should then be cheaper, because the provision of many relatively small power supplies tends to become the most expensive part of the installation. In such complex systems, battery charging means, conveyer lifts and sideways transfer devices may also be installed, and can also be supplied by inductive power transfer.
2. Trackways can be supplied with more, or less current by varying trans-pi component reactances; for example so that a roadway inductive power transfer system receives more current during rush traffic on one side (or the other) of a roadway. At other times losses can be reduced by supplying less current.
3. An elongated trackway can be fed at a higher voltage than can feasibly be generated by present-day devices by tailoring the reactances within the trans-pi network to the impedance of the trackway, so allowing longer distances of inductively powered transportation per power supply unit.
4. An elongated trackway can be fed centrally, using trans-pi networks as per FIG. 12, so that long-distance inductively powered transportation requires (for this example) only half the number of power supplies per unit length of track (the maximum energisable length).

5. Saturable inductors may provide "front-line" protection from open circuit faults in the trackway.

Finally, it will be appreciated that various alterations and modifications may be made to the foregoing without departing from the scope of this invention as set forth in the following claims.

What is claimed is:

1. An apparatus for the supply of power from an alternating power source to the primary conductors of an inductive power transfer system having at least one series compensated primary trackway, each primary trackway having an inherent resonant frequency, wherein said apparatus comprises at least one reactive network having an input and an output; the network being connected between the power source and said at least one primary trackway, wherein said network comprises at least one inductance having a selected value and connected to at least one capacitance having a selected value, and wherein said network controls transfer of power between the supply of power and the at least one primary trackway.

2. The apparatus according to claim 1, wherein the network comprises a transconductance pi network wherein the transconductance pi network comprises one or more inductors and one or more capacitors, the transconductance pi network having an input and an output; the network being connected at the input to the power source and at the output to at least one primary trackway, wherein the network is capable of providing a deliberately mismatched coupling between the source of alternating power and the primary trackway so that the source appears to present a substantially infinite impedance and the primary trackway appears to present a substantially zero impedance; and so that the voltage at the output of the transconductance pi network may in use be substantially greater than that provided to the input of the transconductance pi network.

3. The apparatus according to claim 2, wherein the component values within any one transconductance pi network are selected so that the network is capable of determining the proportion of circulating current to be fed from the output of the network into the primary trackway and so that the amount of circulating current within the primary trackway can be controlled.

4. The apparatus according to claim 3, wherein the apparatus comprises at least one transconductance pi network, each network being connected to a corresponding primary trackway, the network or networks being capable by means of a selection of suitable component values of determining the proportion of circulating current that may be fed from the network into each primary trackway so that the amount of circulating current within the primary trackway can be controlled.

5. The apparatus according to claim 4, wherein the apparatus comprises more than one transconductance pi network each connected through controllable switching means to one primary trackway, so that the amount of circulating current within the primary trackway can be controlled by connection of the outputs of one or more networks at any time to the primary trackway.

6. The apparatus according to claim 4, wherein the apparatus comprises at least one transconductance pi network connected to each primary trackway, the at least one network being provided with at least one set of additional reactive components capable as a group of being controllably switched into or out of the network circuit from a first set of components capable of determining a first current, to a second set of components, capable of determining a second current, so that the circulating current to be supplied from the output of the network into each primary trackway can be controlled from time to time and so that the amount of circulating current within the primary trackway can be controlled.

7. The apparatus, according to claim 6, wherein the transconductance pi network is associated with an inductor provided with a ferrimagnetic or ferromagnetic core capable of saturation at an intended level of current, so that the total circulating current within the network maybe limited.

8. The apparatus according to claim 6, wherein the transconductance pi network is associated with an inductor in which more than one turn of litz wire is held within a conductive container and apart from the inner surface of the container.

9. The apparatus according to claim 6, wherein the transconductance pi network is associated with an inductor which has a ferrimagnetic core comprising one or more ferrite elements each having an interrupted toroidal ferrite core including an air gap threaded over about one turn of litz wire.

10. The apparatus according to claim 9, wherein the one or more ferrite elements are each means of a support occupying the air gap.

11. The apparatus according to claim 2, wherein the apparatus provides switching means across the primary conductors of a primary trackway at a position where any one transconductance pi network is connected to the trackway; the switching means being capable when in a closed state of shorting the trackway so that the amount of circulating current within the primary trackway falls, and so that the primary trackway is in effect disconnected from the power supply yet the power supply itself does not experience a short-circuited output.

12. The apparatus according to claim 2, wherein one or more of the inductive components of any one transconductance pi network are selected so that the one or more inductive components are capable of entering a state of saturation if a current greater than an intended current should flow through the saturable inductor, so that the circulating current within the primary trackway can be limited.

13. The apparatus according to claim 1, wherein said apparatus comprises more than one primary trackway, wherein each primary trackway forms a part of an extended primary trackway; an end of each primary trackway meeting an end of at least one other primary trackway near an alternating power source; each primary trackway being fed at the connection point by a separate transconductance pi network having a switching means connected across the output of the transconductance pi network, so that in use any primary trackway may be energised in response to the presence of a consumer of inductive power upon that primary trackway by opening the corresponding switching means, so that the power supply output may be directed down a selected section of the primary trackway and limitations of trackway length based on power supply capacity are substantially overcome.

14. The apparatus according to claim 1, further comprising termination apparatus; the termination apparatus being connected between an end or one conductor and an end of the other conductor at a position remote from a connection to a power supply, the termination apparatus comprising in parallel connection (A) a resistance capable of exhibiting the characteristic impedance of the track at substantially any frequency, and (B) a series tuned resonant circuit tuned to the inherent resonant frequency; the termination apparatus being capable at the resonant frequency of presenting a short circuit to the track and capable of presenting the characteristic impedance to the track at other frequencies, so that the harmonic content of the current circulating in the track is reduced.

* * * * *

UNITED STATES PATENT AND TRADEMARK OFFICE
CERTIFICATE OF CORRECTION

PATENT NO.     : 6,621,183 B1
DATED          : September 16, 2003
INVENTOR(S)    : John Talbot Boys It is certified that error appears in the above-identified patent and that said Letters Patent is hereby corrected as shown below:

<u>Column 8,</u>
Line 49, "harrnonic" should read -- harmonic --.

<u>Column 11,</u>
Line 21, "904 04" should read -- 904 (j4) --.

Signed and Sealed this

Twenty-seventh Day of January, 2004

JON W. DUDAS
*Acting Director of the United States Patent and Trademark Office*